(12) United States Patent  
Nakanishi et al.

(10) Patent No.: US 10,050,272 B2  
(45) Date of Patent: Aug. 14, 2018

(54) NEGATIVE ELECTRODE ACTIVE MATERIAL FOR NON-AQUEOUS ELECTOLYTE SECONDARY BATTERY AND METHOD OF PRODUCING THE SAME

(71) Applicant: SHIN-ETSU CHEMICAL CO., LTD., Tokyo (JP)

(72) Inventors: Tetsuo Nakanishi, Annaka (JP); Kazuyuki Taniguchi, Annaka (JP); Yoshitaka Aoki, Takasaki (JP); Yoshiyasu Yamada, Tomioka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 238 days.

(21) Appl. No.: 15/104,089

(22) PCT Filed: Dec. 2, 2014

(86) PCT No.: PCT/JP2014/006005  
§ 371 (c)(1),  
(2) Date: Jun. 13, 2016

(87) PCT Pub. No.: WO2015/097990  
PCT Pub. Date: Jul. 2, 2015

(65) Prior Publication Data  
US 2016/0322637 A1  Nov. 3, 2016

(30) Foreign Application Priority Data

Dec. 25, 2013 (JP) .................. 2013-267518  
Dec. 25, 2013 (JP) .................. 2013-267703

(51) Int. Cl.  
*H01M 4/58* (2010.01)  
*H01M 4/36* (2006.01)  
(Continued)

(52) U.S. Cl.  
CPC ....... *H01M 4/5825* (2013.01); *H01M 4/0471* (2013.01); *H01M 4/364* (2013.01);  
(Continued)

(58) Field of Classification Search  
None  
See application file for complete search history.

(56) References Cited

U.S. PATENT DOCUMENTS 5,395,711 A * 3/1995 Tahara .................. H01M 4/485  
                                                                   429/231.3  
5,478,671 A * 12/1995 Idota ..................... H01M 4/131  
                                                                  429/221  
(Continued)

FOREIGN PATENT DOCUMENTS

CN      1674325 A     9/2005  
CN    102214823 A   10/2011  
(Continued)

OTHER PUBLICATIONS

Mar. 3, 2015 International Search Report issued in International Patent Application No. PCT/JP2014/006005.  
(Continued)

*Primary Examiner* — Scott J. Chmielecki  
(74) *Attorney, Agent, or Firm* — Oliff PLC

(57) ABSTRACT

A negative electrode active material for a non-aqueous electrolyte secondary battery, wherein the negative electrode active material is represented by an elemental composition formula of $Met^1$-Si—O—C—H (wherein $Met^1$ represents one alkali metal element or a mixture of alkali metal elements), including: a silicate salt made of a silicon-based inorganic compound and the alkali metal, and fine particles composed of silicon, silicon alloy, or silicon oxide being dispersed in the silicate salt; and a negative electrode active material for a non-aqueous electrolyte secondary battery, (Continued)

wherein the negative electrode active material is represented by an elemental composition formula of $Met^2$-Si—O—C—H (wherein $Met^2$ represents one alkaline earth metal element or a mixture of alkaline earth metal elements), including: a silicate salt made of a silicon-based inorganic compound and the alkaline earth metal.

24 Claims, 4 Drawing Sheets

(51) Int. Cl.
  *H01M 4/38*  (2006.01)
  *H01M 4/48*  (2010.01)
  *H01M 4/04*  (2006.01)
  *H01M 4/62*  (2006.01)
  *H01M 10/0525*  (2010.01)
  *H01M 4/02*  (2006.01)

(52) U.S. Cl.
  CPC ........... *H01M 4/386* (2013.01); *H01M 4/483* (2013.01); *H01M 4/625* (2013.01); *H01M 10/0525* (2013.01); *H01M 2004/027* (2013.01)

(56) References Cited

U.S. PATENT DOCUMENTS

| | | | | |
|---|---|---|---|---|
| 5,556,721 | A * | 9/1996 | Sasaki | H01M 4/0461 205/59 |
| 5,587,256 | A * | 12/1996 | Wilson | H01M 2/348 29/623.1 |
| 5,698,340 | A * | 12/1997 | Xue | H01M 4/36 423/594.15 |
| 5,824,280 | A * | 10/1998 | Dahn | H01M 4/587 423/325 |
| 5,907,899 | A * | 6/1999 | Dahn | H01M 4/587 252/182.1 |
| 6,066,414 | A * | 5/2000 | Imoto | C01B 21/0821 423/385 |
| 6,383,686 | B1 * | 5/2002 | Umeno | H01M 4/38 429/218.1 |
| 6,413,672 | B1 * | 7/2002 | Suzuki | H01M 4/04 429/231.8 |
| 2003/0129494 | A1 * | 7/2003 | Kaneda | H01M 4/133 429/231.1 |
| 2005/0214644 | A1 | 9/2005 | Aramata et al. | |
| 2006/0275662 | A1 * | 12/2006 | Hirose | H01M 4/134 429/218.1 |
| 2007/0048604 | A1 * | 3/2007 | Gaillard | H01M 2/0275 429/175 |
| 2007/0099081 | A1 * | 5/2007 | Matsuda | B22F 1/0059 429/217 |
| 2007/0224509 | A1 * | 9/2007 | Aramata | H01M 4/131 429/231.95 |
| 2008/0305399 | A1 * | 12/2008 | Martin | C23C 16/30 429/306 |
| 2011/0244334 | A1 | 10/2011 | Kawada | |
| 2012/0171560 | A1 * | 7/2012 | Xu | H01M 4/134 429/188 |

FOREIGN PATENT DOCUMENTS

| | | |
|---|---|---|
| EP | 2372817 A1 | 10/2011 |
| JP | H08-40716 A | 2/1996 |
| JP | H08-259213 A | 10/1996 |
| JP | H10-74506 A | 3/1998 |
| JP | H10-74520 A | 3/1998 |
| JP | 2964732 B2 | 10/1999 |
| JP | 2997741 B2 | 1/2000 |
| JP | 3008228 B2 | 2/2000 |
| JP | 2000-173596 A | 6/2000 |
| JP | 2000-215887 A | 8/2000 |
| JP | 3079343 B2 | 8/2000 |
| JP | 2000-243396 A | 9/2000 |
| JP | 3242751 B2 | 12/2001 |
| JP | 2002-042806 A | 2/2002 |
| JP | 2002-075351 A | 3/2002 |
| JP | 3291260 B2 | 6/2002 |
| JP | 2003-109590 A | 4/2003 |
| JP | 2004-185991 A | 7/2004 |
| JP | 2004-303593 A | 10/2004 |
| JP | 3622629 B2 | 2/2005 |
| JP | 3622631 B2 | 2/2005 |
| JP | 2005-190902 A | 7/2005 |
| JP | 2005-235589 A | 9/2005 |
| JP | 2005-317309 A | 11/2005 |
| JP | 2006-216374 A | 8/2006 |
| JP | 2006-236684 A | 9/2006 |
| JP | 3846661 B2 | 11/2006 |
| JP | 2006-338996 A | 12/2006 |
| JP | 2006-339092 A | 12/2006 |
| JP | 2007-511877 A | 5/2007 |
| JP | 3918311 B2 | 5/2007 |
| JP | 2007-294422 A | 11/2007 |
| JP | 2008-293974 A | 12/2008 |
| JP | 4623283 B2 | 2/2011 |
| JP | 5003877 B2 | 8/2012 |
| WO | 2012/176039 A1 | 12/2012 |
| WO | 2013/002157 A1 | 1/2013 |
| WO | 2013/038884 A1 | 3/2013 |

OTHER PUBLICATIONS

Aug. 22, 2017 Extended Search Report issued in European Patent Application No. 14873882.6.
Apr. 4, 2018 Office Action issued in Chinese Patent Application No. 201480070974.5.

* cited by examiner

[FIG. 1]
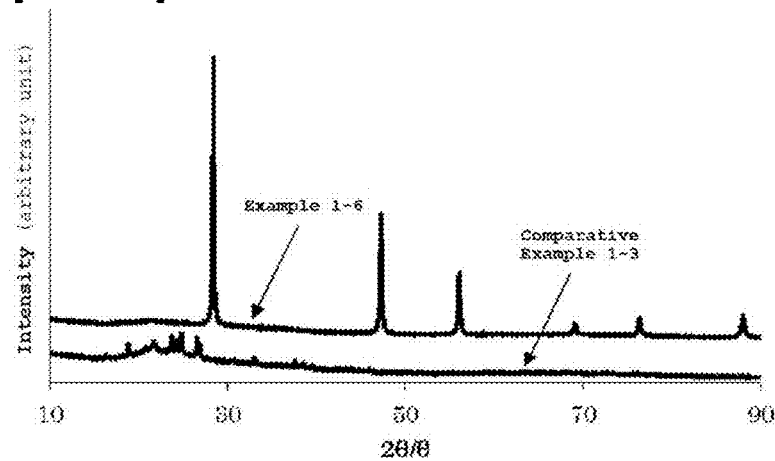
[FIG. 2]
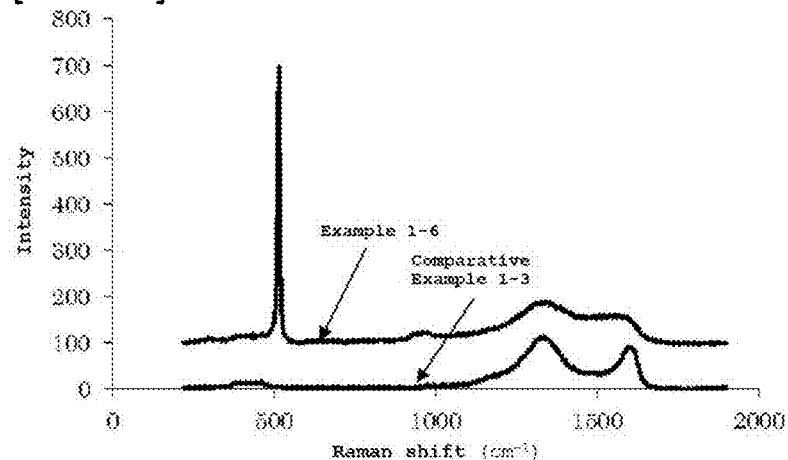
[FIG. 3]
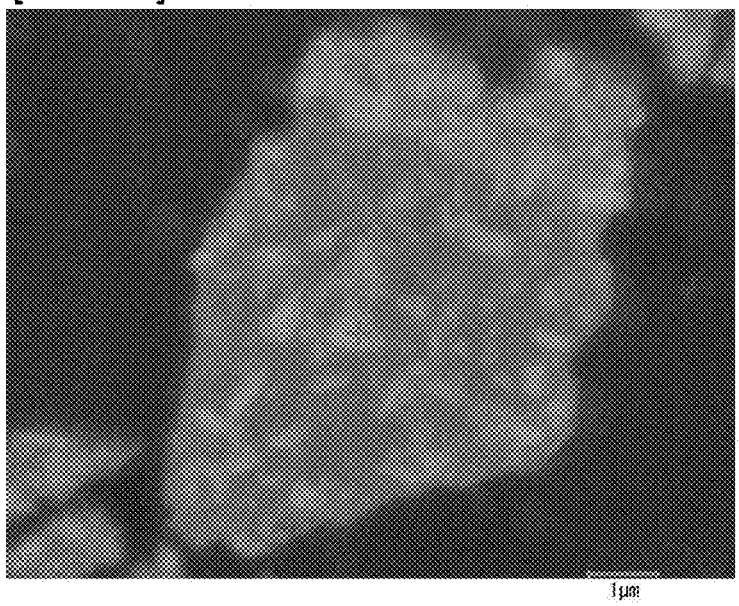

[FIG. 4]
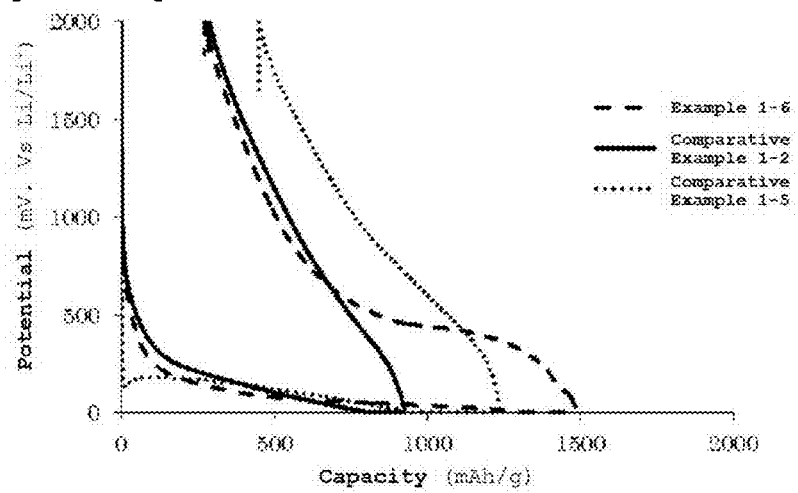
[FIG. 5]
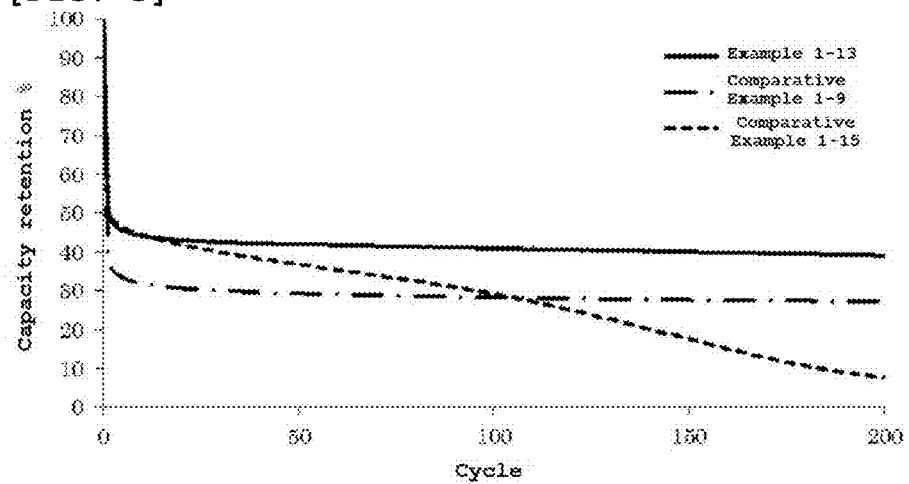
[FIG. 6]
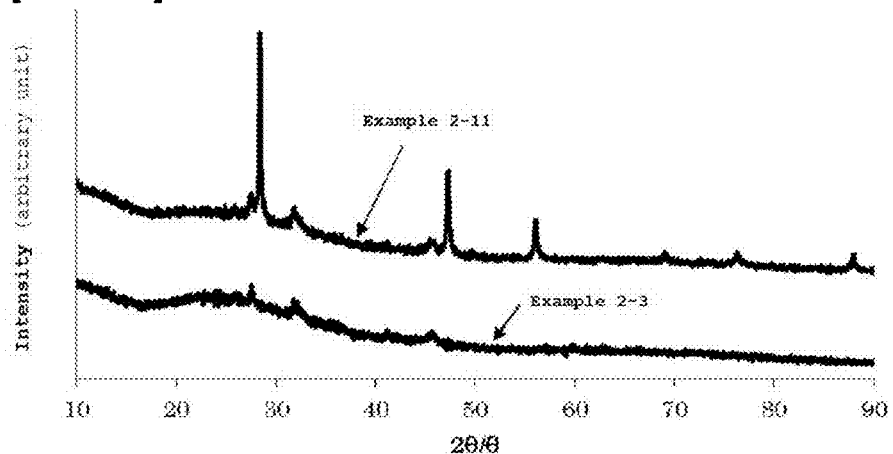

[FIG. 7]
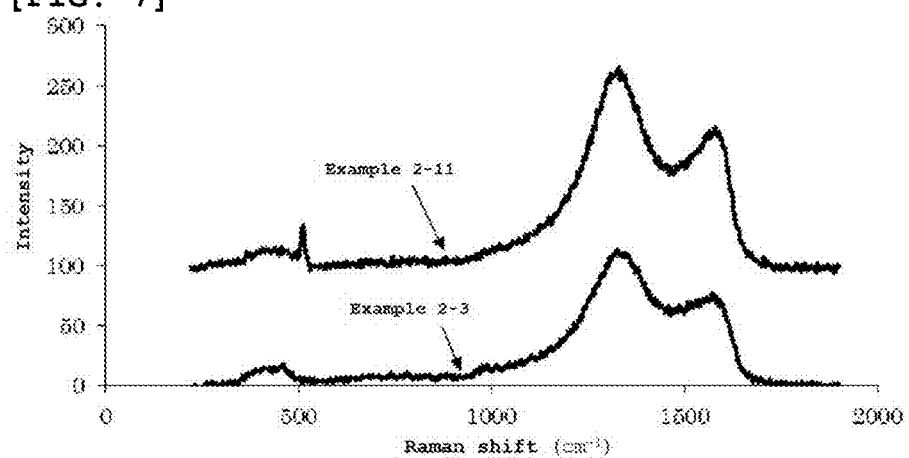
[FIG. 8]
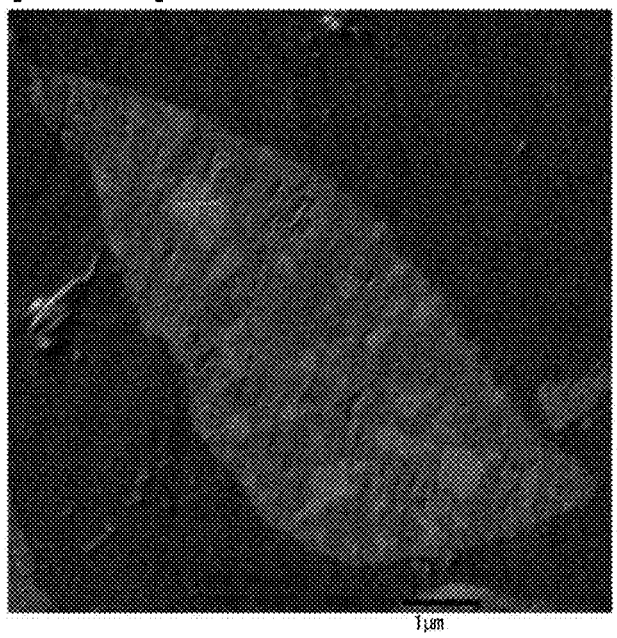

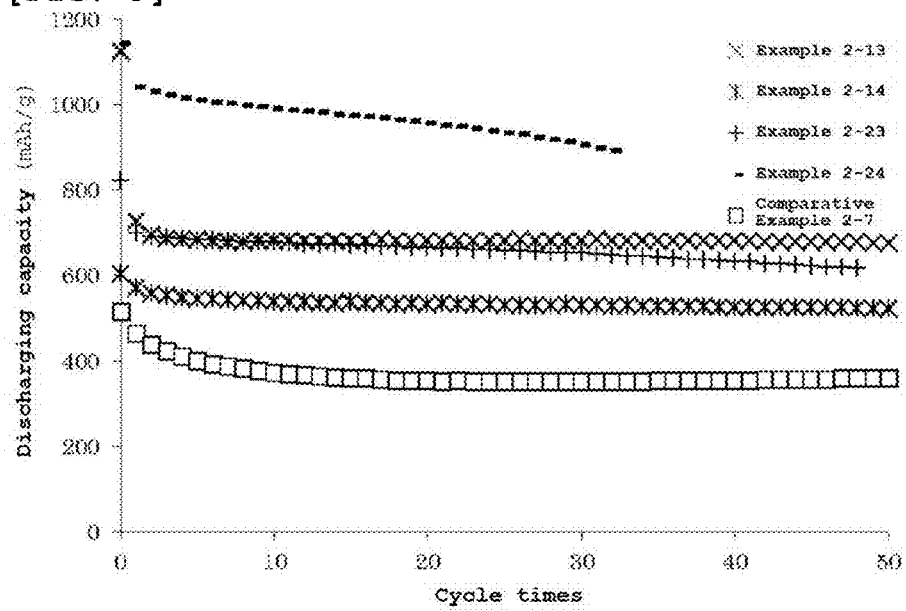
[FIG. 9]

NEGATIVE ELECTRODE ACTIVE MATERIAL FOR NON-AQUEOUS ELECTOLYTE SECONDARY BATTERY AND METHOD OF PRODUCING THE SAME

TECHNICAL FIELD

The present invention relates to a negative electrode active material for a non-aqueous electrolyte secondary battery and a method of producing the same. The present invention also relates to a negative electrode for a non-aqueous electrolyte secondary battery using the negative electrode active material, and a non-aqueous electrolyte secondary battery using the negative electrode.

BACKGROUND ART

As mobile devices such as mobile electronic devices and mobile communication devices have highly developed, non-aqueous electrolyte secondary batteries with higher energy density are recently needed to improve economic efficiency and reduce the size and weight of the devices. The capacity of the non-aqueous electrolyte secondary batteries of this type can be improved by known methods: use of a negative electrode material made of an oxide of B, Ti, V, Mn, Co, Fe, Ni, Cr, Nb, or Mo, or a composite oxide thereof (See patent document 1 and 2, for example); use of a negative electrode material made of $M_{100-x}Si_x$ (x≥50 at %, M=Ni, Fe, Co, Mn) subjected to melting and rapid cooling (patent document 3); use of a negative electrode material made of a silicon oxide (patent document 4); use of a negative electrode material made of $Si_2N_2O$, $Ge_2N_2O$, and $Sn_2N_2O$ (patent document 5), and others.

Since silicon has a theoretical capacity of 3580 mAh/g far higher than a theoretical capacity of 372 mAh/g of a carbon material that is put in practical use at the present time, it is a material most expected in miniaturization and higher capacity of a battery. Silicon is known in various forms different in a crystal structure according to a manufacturing method thereof. For example, patent document 6 discloses a lithium ion secondary battery that uses single crystal silicon as a support of a negative electrode active material. Patent document 7 discloses a lithium ion secondary battery that uses a lithium alloy $Li_xSi$ (x: 0 to 5) using single crystal silicon, polycrystalline silicon, and amorphous silicon. According to the document, $Li_xSi$ that uses amorphous silicon is particularly preferred, and pulverized crystalline silicon covered with amorphous silicon obtained by plasma decomposition of silane gas is illustrated.

The negative electrode material can be endowed with conductivity by known methods: mechanical alloying metal oxide such as silicon oxide with graphite, followed by carbonization (patent document 8); coating the surface of a Si particle with a carbon layer by chemical deposition method (patent document 9); coating the surface of a silicon oxide particle with a carbon layer by chemical deposition method (patent document 10). These methods can improve the conductivity by the carbon layer provided onto the particle surface, but cannot relax the large volume change due to charge/discharge, and cannot prevent degradation of ability to collect current and cycle performance reduction due to the large volume change, which are problems of silicon negative electrodes.

Accordingly, in recent years, the following methods are disclosed: a method where a usage rate of silicon in battery capacity is restricted to suppress volume expansion (patent documents 9, 11 to 13); and as a method where a grain boundary of polycrystalline particles is used as a buffering region of the volume change, a method where a silicon melt in which alumina is added is quenched (patent document 14), a method using polycrystalline particles composed of mixed phase polycrystals of α, $\beta$-$FeSi_2$ (patent document 15), and a high-temperature plastic forming process of a single crystal silicon ingot (patent document 16).

Methods to design a laminating structure of the silicon active material to relax volume expansion are also disclosed, for example, a method to arrange silicon negative electrodes into two layers (patent document 17), a method to suppress the collapse of particles by coating or encapsulating with carbon, other metal or oxide (patent documents 18 to 24). In direct vapor growth of silicon onto a current collector, a method controlling the growth direction to suppress the lowering of cycle performance due to volume expansion is also disclosed (patent document 25).

As described above, silicon, silicon alloy, and silicon oxide have been investigated as a negative electrode active material. However, it has not been proposed a practical negative electrode active material which fulfills following features: volume change due to occluding and emitting Li is sufficiently suppressed, lowering of the conductivity due to separating from a current collector or fine pulverization caused by breakage of particles can be relaxed, mass production is possible, and is cost-favorable.

On the other hand, it is disclosed that composite oxides composed of elements of SiOC, being formed by baking methylsiloxanes such as silane, silicone oil, and silicone resin at a high temperature, has a charging or discharging capacity (patent documents 26 to 29). Although the discharging capacity is 500 mAh/g or so, the cycle performance is excellent. However, there has been a disadvantage that the energy density is not increased since the irreversible capacity is extremely high and the discharge curve changes linearly. Accordingly, some methods has been proposed: adding metal Li to the composite oxide and reacting chemically to dissolve the irreversible capacity; or adding metal silicon, which has low irreversible capacity, to increase the battery capacity, thereby increasing the capacity efficiency by weight (patent documents 30, 31). By these methods, however, sufficient property for practical use cannot be exhibited.

CITATION LIST

Patent Literature

Patent Document 1: Japanese Patent No. 3008228
Patent Document 2: Japanese Patent No. 3242751
Patent Document 3: Japanese Patent No. 3846661
Patent Document 4: Japanese Patent No. 2997741
Patent Document 5: Japanese Patent No. 3918311
Patent Document 6: Japanese Patent No. 2964732
Patent Document 7: Japanese Patent No. 3079343
Patent Document 8: Japanese Unexamined Patent Publication (Kokai) No. 2000-243396
Patent Document 9: Japanese Unexamined Patent Publication (Kokai) No. 2000-215887
Patent Document 10: Japanese Unexamined Patent Publication (Kokai) No. 2002-42806
Patent Document 11: Japanese Unexamined Patent Publication (Kokai) No. 2000-173596
Patent Document 12: Japanese Patent No. 3291260
Patent Document 13: Japanese Unexamined Patent Publication (Kokai) No. 2005-317309

Patent Document 14: Japanese Unexamined Patent Publication (Kokai) No. 2003-109590
Patent Document 15: Japanese Unexamined Patent Publication (Kokai) No. 2004-185991
Patent Document 16: Japanese Unexamined Patent Publication (Kokai) No. 2004-303593
Patent Document 17: Japanese Unexamined Patent Publication (Kokai) No. 2005-190902
Patent Document 18: Japanese Unexamined Patent Publication (Kokai) No. 2005-235589
Patent Document 19: Japanese Unexamined Patent Publication (Kokai) No. 2006-216374
Patent Document 20: Japanese Unexamined Patent Publication (Kokai) No. 2006-236684
Patent Document 21: Japanese Unexamined Patent Publication (Kokai) No. 2006-339092
Patent Document 22: Japanese Patent No. 3622629
Patent Document 23: Japanese Unexamined Patent Publication (Kokai) No. 2002-75351
Patent Document 24: Japanese Patent No. 3622631
Patent Document 25: Japanese Unexamined Patent Publication (Kokai) No. 2006-338996
Patent Document 26: Japanese Unexamined Patent Publication (Kokai) No. H08-40716
Patent Document 27: Japanese Unexamined Patent Publication (Kokai) No. H08-259213
Patent Document 28: Japanese Unexamined Patent Publication (Kokai) No. H10-74506
Patent Document 29: Japanese Unexamined Patent Publication (Kokai) No. H10-74520
Patent Document 30: Japanese Patent No. 4623283
Patent Document 31: Japanese Patent No. 5003877

SUMMARY OF INVENTION

Technical Problem

The present invention was accomplished in view of the above-described circumstances. It is an object of the present invention to provide a negative electrode active material for a non-aqueous electrolyte secondary battery that enables production of a negative electrode for a non-aqueous electrolyte secondary battery with smaller irreversible capacity and high energy density, to provide a non-aqueous electrolyte secondary battery using such negative electrode active material as negative electrode material, and to provide a method of producing a negative electrode active material which can produce such negative electrode active material.

Solution to Problem

To solve the above problems, the present invention provides a negative electrode active material for a non-aqueous electrolyte secondary battery, wherein the negative electrode active material is represented by an elemental composition formula of $Met^1$-Si—O—C—H (wherein $Met^1$ represents one alkali metal element or a mixture of alkali metal elements), comprising: a silicate salt made of a silicon-based inorganic compound and the alkali metal, and fine particles composed of silicon, silicon alloy, or silicon oxide being dispersed in the silicate salt.

Such a negative electrode active material can provide small irreversible capacity and high energy density when used as a negative electrode material for a non-aqueous electrolyte secondary battery.

In this case, the alkali metal element is preferably Li or Na.

By using Li or Na as the alkali metal element, it is possible to provide smaller irreversible capacity and high energy density when the negative electrode active material is used as a negative electrode material for a non-aqueous electrolyte secondary battery.

To solve the above problems, the present invention also provides a negative electrode active material for a non-aqueous electrolyte secondary battery, wherein the negative electrode active material is represented by an elemental composition formula of $Met^2$-Si—O—C—H (wherein $Met^2$ represents one alkaline earth metal element or a mixture of alkaline earth metal elements), comprising: a silicate salt made of a silicon-based inorganic compound and the alkaline earth metal.

Such a negative electrode active material can provide low volume resistivity and small irreversible capacity when used as a negative electrode material for a non-aqueous electrolyte secondary battery. This negative electrode active material can also provide high storage stability in a state of electrode paste for producing electrodes.

In this case, the alkaline earth metal element is preferably Mg or Ca.

By using Mg or Ca as the alkaline earth metal element, it is possible to provide smaller irreversible capacity when the negative electrode active material is used as a negative electrode material for a non-aqueous electrolyte secondary battery.

It is preferable that fine particles composed of silicon, silicon alloy, or silicon oxide are dispersed in the silicate salt.

By dispersing fine particles composed of silicon, silicon alloy, or silicon oxide in the silicate salt, a negative electrode active material with higher capacity and high energy density can be obtained.

In these negative electrode active material for a non-aqueous electrolyte secondary battery, preferably, the silicate salt further contains group 3 to group 13 metal. In this case, the group 3 to group 13 metal is preferably first row transition metal or second row transition metal.

By adding group 3 to group 13 metal, especially first row transition metal or second row transition metal in addition to the alkali metal or the alkaline earth metal, the irreversible capacity of a negative electrode active material can be effectively decreased.

It is also preferable that carbon particles are dispersed in the silicate salt.

By dispersing carbon particles in the silicate salt, the inventive negative electrode active material for a non-aqueous electrolyte secondary battery can have smaller irreversible capacity and high energy density when the negative electrode active material is used as a negative electrode material for a non-aqueous electrolyte secondary battery.

The present invention also provides a negative electrode for a non-aqueous electrolyte secondary battery, comprising any of the foregoing negative electrode active material for a non-aqueous electrolyte secondary battery.

The present invention further provides a non-aqueous electrolyte secondary battery, comprising the foregoing negative electrode for a non-aqueous electrolyte secondary battery.

The negative electrode for a non-aqueous electrolyte secondary battery and the non-aqueous electrolyte secondary battery using the inventive negative electrode active material can provide small irreversible capacity and high energy density as well as low volume resistivity.

The present invention also provides a method of producing a negative electrode active material for a non-aqueous electrolyte secondary battery, comprising the steps of: mixing a compound of alkali metal, a composition containing a curable organic silicon compound, and fine particles composed of silicon, silicon alloy, or silicon oxide to form a raw material mixture; curing the curable organic silicon compound to cure the raw material mixture; and baking the cured raw material mixture to make the curable organic silicon compound to be inorganic material.

By mixing each raw materials previously as described above, and then curing and baking the mixture to produce a negative electrode active material, it is possible to produce a negative electrode active material comprising a silicate salt made of a silicon-based inorganic compound and the alkali metal, and fine particles composed of silicon, silicon alloy, or silicon oxide being dispersed in the silicate salt. Such a negative electrode active material can provide small irreversible capacity and high energy density when used as a negative electrode material for a non-aqueous electrolyte secondary battery.

The present invention also provides a method of producing a negative electrode active material for a non-aqueous electrolyte secondary battery, comprising the steps of: mixing a compound of alkaline earth metal, a composition containing a curable organic silicon compound to form a raw material mixture; curing the curable organic silicon compound to cure the raw material mixture; and baking the cured raw material mixture to make the curable organic silicon compound to be inorganic material.

By mixing each raw materials previously as described above, and then curing and baking the mixture to produce a negative electrode active material, it is possible to produce a negative electrode active material comprising a silicate salt made of a silicon-based inorganic compound and the alkaline earth metal. Such a negative electrode active material can provide low volume resistivity and small irreversible capacity when used as a negative electrode material for a non-aqueous electrolyte secondary battery. This negative electrode active material can also provide high storage stability in a state of an electrode paste for producing an electrode.

In this case, preferably, the raw material mixture is further mixed with fine particles composed of silicon, silicon alloy, or silicon oxide.

By mixing fine particles composed of silicon, silicon alloy, or silicon oxide into the raw material mixture as described above, these fine particles can be dispersed in the negative electrode active material to be produced.

In these negative electrode active material for a non-aqueous electrolyte secondary battery, preferably, the raw material mixture is further mixed with a compound of group 3 to group 13 metal.

By mixing a compound of group 3 to group 13 metal into the raw material mixture as described above, group 3 to group 13 metal can be homogeneously contained in the silicate salt in the negative electrode active material to be produced.

Preferably, the raw material mixture is further mixed with carbon particles. In this case, the carbon particles can be composed of any of natural graphite, synthetic graphite, and carbon fiber.

By mixing carbon particles into the raw material mixture as described above, carbon particles can be dispersed in the negative electrode active material to be produced.

Advantageous Effects of Invention

The inventive negative electrode active material for a non-aqueous electrolyte secondary battery represented by an elemental composition formula of $Met^1$-Si—O—C—H (wherein $Met^1$ represents one alkali metal element or a mixture of alkali metal elements) can be a negative electrode active material for a non-aqueous electrolyte secondary battery with small irreversible capacity and high energy density when used for a non-aqueous electrolyte secondary battery. By the inventive negative electrode active material, generation of decomposed gas of the electrolyte is decreased, and collapse of the electrode due to the volume expansion is relaxed, and therefore excellent cycle performance can be obtained.

The inventive negative electrode active material for a non-aqueous electrolyte secondary battery represented by an elemental composition formula of $Met^2$-Si—O—C—H (wherein $Met^2$ represents one alkaline earth metal element or a mixture of alkaline earth metal elements) can be a negative electrode active material for a non-aqueous electrolyte secondary battery with low volume resistivity and small irreversible capacity when used for a non-aqueous electrolyte secondary battery. By the inventive negative electrode active material, generation of decomposed gas of the electrolyte is decreased, and collapse of the electrode due to the volume expansion is relaxed, and therefore excellent cycle performance can be obtained. Moreover, the inventive negative electrode active material can also provide high storage stability in a state of electrode paste for producing electrodes.

In addition, the inventive method of producing a negative electrode active material for a non-aqueous electrolyte secondary battery can produce the negative electrode active material with foregoing constitutions.

BRIEF DESCRIPTION OF DRAWINGS

FIG. 1 shows powder X-ray diffraction spectra of particles obtained by Example 1-6 and Comparative Example 1-3;

FIG. 2 shows spectra of Raman spectroscopy of the particle surfaces of particles obtained by Example 1-6 and Comparative Example 1-3;

FIG. 3 shows a cross-sectional image of scanning electron microscope of particles obtained by Example 1-6, and the part marked with "+" in the center of the figure indicates a metal silicon particle;

FIG. 4 shows charge/discharge curves of particles in Example 1-6, Comparative Examples 1-2 and 1-5;

FIG. 5 is a graph of evaluations of cycle performance in Example 1-13, Comparative Examples 1-9 and 1-15;

FIG. 6 shows powder X-ray diffraction spectra of particles obtained by Example 2-3 and Example 2-11;

FIG. 7 shows spectra of Raman spectroscopy of the particle surfaces of particles obtained by Example 2-3 and Example 2-11;

FIG. 8 shows a cross-sectional image of scanning electron microscope of particles obtained by Example 2-10, and the part marked with "+" in the center of the figure indicates a metal silicon particle; and FIG. 9 is a graph of evaluations of cycle performance in Examples 2-13, 2-14, 2-23, and 2-24, and Comparative Example 2-7.

DESCRIPTION OF EMBODIMENTS

As described above, composite oxides composed of elements of SiOC have a disadvantage as a negative electrode active material, in which the energy density is not increased since the irreversible capacity is extremely high and the discharge curve changes linearly.

The inventors have diligently investigated to solve the problem described above, and have found that the means to improve the battery capacity and the first efficiency by adding metal silicon to Si—O—C material, which is known material, requires to add a large amount of metal silicon in order to make the irreversible capacity relatively lower, and thus causes volume expansion, which is a defect of metal silicon, considerably, and is not practical. On the other hand, in the means to improve the first efficiency by adding metal lithium, there is a problem of treating ignitable metal lithium. Moreover, it was found that an increase of metal lithium usage lowers the original battery capacity of Si—O—C, nevertheless, the average potential is low and the energy density remains low as shown in the discharge curve.

The inventors have further investigated on the basis of the foregoing knowledge, and have found the inventive negative electrode active material and the producing method thereof as a means to improve the energy density without deteriorating the battery capacity in order to make a silicon composite which is effective as an active material for a negative electrode for a non-aqueous electrolyte secondary battery having smaller irreversible capacity, high energy density, and an effect of decreasing the volume change during charge and discharge, which have been a problem of silicon-based negative electrode active material.

The present invention provides a negative electrode active material made of a silicon composite with improved cycle performance and charge/discharge efficiency of a silicon-based negative electrode material, which has a serious bottleneck of performance deterioration due to repeated charge and discharge, although being expected as a negative electrode active material for a non-aqueous electrolyte secondary battery as having charging or discharging capacity several times larger compared to the capacity of main-current graphite-based one.

In the following, the present invention will be explained in more detail.

First Embodiment

The first embodiment of the present invention will be explained.

The inventive negative electrode active material for a non-aqueous electrolyte secondary battery of the first embodiment is represented by an elemental composition formula of $Met^1$-Si—O—C—H. In the elemental composition formula, $Met^1$ represents one alkali metal element or a mixture of alkali metal elements. This negative electrode active material contains a silicate salt made of a silicon-based inorganic compound and the alkali metal, and fine particles composed of silicon, silicon alloy, or silicon oxide (hereinafter also called generically as "silicon-based fine particles" simply) being dispersed in the silicate salt. The alkali metal element is preferably Li or Na. Preferably, the silicate salt further contains group 3 to group 13 metal. More preferably, this group 3 to group 13 metal is first row transition metal or second row transition metal. In the inventive negative electrode active material, carbon particles can be dispersed in the silicate salt.

In the inventive negative electrode active material, the silicon-based inorganic compound forms a silicate salt with the alkali metal (or alkali metal and group 3 to group 13 element), and silicon-based fine particles (or silicon-based fine particles and carbon particles) are dispersed in the silicate salt. Such constitution can provide a negative electrode active material with low volume resistivity and low irreversible capacity as well as large battery capacity and flat discharge curve, thereby having high energy density. In the inventive negative electrode active material (silicon composite), the silicon-based fine particles function as an active material, and the silicate salt, in which the silicon-based fine particles are dispersed, also functions as an active material. As the alkali metal used in the present invention, any of group 1 elements except for hydrogen can give the effect of the present invention, however, Li or Na is particularly preferable.

The inventive negative electrode active material is preferably a particulate one with the volume-average particle size of the primary particle of 0.1 to 30 µm.

Such an inventive negative electrode active material can be obtained by mixing the silicon-based fine particles, a compound of alkali metal, and a composition containing a curable organic silicon compound, followed by baking the mixture.

Specifically, at least the following steps (a) to (c) are gone through:
(a) mixing the compound of alkali metal, the composition containing a curable organic silicon compound, and the fine particles composed of silicon, silicon alloy, or silicon oxide to form a raw material mixture;
(b) curing the curable organic silicon compound to cure the raw material mixture; and
(c) baking the cured raw material mixture to make the curable organic silicon compound to be inorganic material.

Illustrative examples of the silicon usable for producing method of the inventive negative electrode active material include industrial metal silicon with a purity of 95% or more (i.e., 95 to 100%), particularly 99.0% or more (i.e., 99.0 to 100%); polycrystalline silica and single crystal silica for semiconductors or for solar cells. In the present invention, it is possible to use silicon alloy in which the foregoing silicon is incorporated with any of typical elements and transition metals such as Al, Ti, Co, Fe. As the silicon oxide, it is possible to use silicon oxide represented by the general formula $SiOx$ ($1 \leq x < 1.6$) and is obtained by thermal treatment of amorphous material under an inert gas atmosphere to disproportionate to silicon and silicon dioxide. It may also be a silicon particle, a silicon alloy particle, or a silicon oxide particle, the surface of which is subjected to water-repellent treatment with alkoxymethylsilane or alkoxyvinylsilane, or coated with carbon.

The primary particle size of these silicon, silicon alloy, or silicon oxide is preferably 100 nm to 10 µm in a volume-average particle size (e.g., particle size $D_{50}$ at the cumulative volume of 50% or median size) by a measuring method of particle size distribution by a laser diffraction method. This particle size is more preferably 100 nm to 7 µm, further preferably 100 nm to 1 µm. It is particularly preferable for the particle size to be uniform.

As the curable organic silicon compound used in the present invention, it is preferable to use a curable silicone composition, which is a composition of a reactive organic silicon compound having a cross-linkable group. The curable silicone composition is not particularly limited, and any known curable silicone composition can be used. Illustrative examples thereof include silicone compositions which are organic peroxide curable, radiation curable reactive, addition curable reactive, and condensation curable. In order to obtain a silicon-based inorganic compound with higher purity through baking to inorganic material, it is advantageous to use a silicone composition which is organic peroxide curable or radiation curable reactive. By selecting these composition, it is possible to suppress the total content of the impurity elements in the obtained silicon-based inorganic compound powder to 1 ppm or less, preferably 0.5 ppm or less, more preferably 0.1 ppm or less. Illustrative examples of the impurity elements particularly include Fe, Cr, Ni, Al, Ti, Cu, Na, Zn, Ca, Zr, Mg, and B, and the total content thereof can be suppressed as described above. Although alkali metal elements such as Na are mixed into the raw material mixture as described above, it is preferable for the curable organic silicon compound to be highly purified in order to suppress the impurities except for alkali metal elements in the curable organic silicon compound. In other words, it is difficult to decrease the impurities except for alkali metal elements solely from the curable organic silicon compound.

Illustrative examples of the organic peroxide curable silicone composition include a silicone composition which can be cured by radical polymerization of linear organopolysiloxane having alkenyl groups such as a vinyl group at the terminal part (one of or both of the terminal parts) of the molecular chain or non-terminal part of the molecular chain, or both of them under the presence of an organic peroxide.

Illustrative examples of the radiation curable silicone composition include an ultraviolet curable silicone composition and an electron beam curable silicone composition.

As the ultraviolet curable silicone composition, a silicone composition which can be cured by energy of ultraviolet with a wavelength of 200 to 400 nm, for example, is mentioned. In this case, the curing mechanism is not particularly limited. Illustrative examples thereof include an acrylic-silicone-based silicone composition which contains a photopolymerization initiator and organopolysiloxane having an acryloyl group or a methacryloyl group; mercapto-vinyl addition polymerization-based silicone composition which contains a photopolymerization initiator, mercapto group-containing organopolysiloxane, and alkenyl group-containing organopolysiloxane such as vinyl group-containing organopolysiloxane; an addition reaction type silicone composition using a platinum group metal-based catalyst same as in thermosetting addition reaction type; a cationic polymerization type silicone composition which contains an onium salt catalyst and epoxy group-containing organopolysiloxane; all of which can be used as an ultraviolet curable silicone composition.

As the electron beam curable silicone composition, it is possible to use any silicone composition being curable by radical polymerization which is initiated by irradiating an electron beam to organopolysiloxane having a radical polymerizable group.

Illustrative examples of the addition curable silicon composition include the foregoing silicone composition which is cured by reacting alkenyl group-containing linear organopolysiloxane and organohydrogenpolysiloxane under a platinum group metal-based catalyst (hydrosilylation addition reaction).

Illustrative examples of the condensation curable silicone composition include a silicone composition which is cured by reacting organopolysiloxane the both terminals of which has been blocked with silanol groups and organohydrogenpolysiloxane or hydrolysable silane such as tetraalkoxysilane and organotrialkoxysilane and/or partial hydrolysis condensate thereof under a condensation reaction catalyst such as an organotin-based catalyst; and a silicone composition which is cured by condensation reaction of organopolysiloxane the both terminals of which has been blocked with trialkoxy groups, dialkoxyorgano groups, trialkoxysiloxyethyl groups, dialkoxyorganosiloxyethyl groups, or others under an organotin catalyst, for example.

However, in order to avoid contamination of impurity elements, the radiation curable silicone composition and the organic peroxide curable silicone composition are desirable.

The irreversible capacity can be effectively decreased by adding a metal compound of the alkali metal before the stage for curing the curable silicone composition of step (b), that is in a stage of step (a). In this case, the irreversible capacity can be more effectively decreased by adding a compound of group 3 to group 13 metal, etc. As the alkali metal compound to be added, metal compounds such as hydroxide, oxide, carbonate, and oxalate of the alkali metal are preferably used in view of the reactivity with the curable silicone composition. Particularly, use of carbonate or oxalate of Li or Na and so on are preferable since the reaction can proceed effectively at the temperature where the silicon composite is formed. These alkali metal compounds are easy to handle compared to use of the metal simple substance. The group 3 to group 13 metal can be introduced by adding a metal compound such as Al and first row transition metal such as Ti, V, Cr, Mn, Fe, Co, Ni, Cu, Zn, and Ga. It can be a second row transition metal such as Zr, Nb, and Mo. As the metal compound, although various one can also be selected, hydroxide, oxide, and esterified compounds are preferable in view of the reactivity.

As the loading ratio of the silicon, silicon alloy, or silicon oxide and the composition of a curable organic silicon compound; silicon, silicon alloy, or silicon oxide is preferably 5 parts by mass or more, more preferably 10 parts by mass or more, with respect to 150 parts by mass of the composition of a curable organic silicon compound. On the other hand, as the upper limit, silicon, silicon alloy, or silicon oxide is preferably 200 parts by mass or less, more preferably 100 parts by mass or less, particularly preferably 50 parts by mass or less, with respect to the 100 parts by mass of the composition of a curable organic silicon compound. These preferable values of the upper limit are based on considering the weight loss on heating after the baking, which is approximately 30% by weight especially when a curable silicone is used as the curable organic silicon compound.

The loading amount of the alkali metal compound or the total loading amount of the alkali metal compound and the compound of group 3 to group 13 metal is preferably 10 to 100 parts by mass with respect to 150 parts by mass of the curable organic silicon compound. This loading amount is more preferably 20 to 80 parts by mass, particularly preferably 30 to 60 parts by mass in view of efficiency to decrease the irreversible capacity and economic efficiency.

Before the stage to cure the curable silicone composition of step (b), that is in the stage of step (a), carbon particles can be added. The carbon particles to be added may be a conductive aid such as graphite and acetylene black. Particularly, it is preferable to be composed of any of natural graphite, synthetic graphite, and carbon fiber. The loading ratio is preferably 1 part by mass or more, more preferably 5 parts by mass or more with respect to 150 parts by mass of the curable organic silicon compound. This range enables to effectively decrease the volume resistivity of the silicon composite after the baking, and enables to improve the rate characteristic of the active material.

The foregoing raw material mixture obtained through mixing is cured (step (b)). The curing condition depends on the curable organic silicon compound to be used as described above, and may be a condition by which the curable organic silicon compound can be cured. After finishing the curing of step (b), the cured material is preferably pulverized prior to baking of step (c).

The compound of alkali metal, the composition containing a curable organic silicon compound, and the fine particles composed of silicon, silicon alloy, or silicon oxide are mixed and cured through steps (a) and (b), and subsequently the cured raw material mixture is baked to make the curable organic silicon compound to be inorganic material (step (c)). This baking temperature is preferably the temperature of 600 to 1200° C. Since the reaction rapidly proceeds at about 600° C. and nearly ends at approximately 1000° C., the baking temperature is more preferably set to 600 to 1000° C. The baking temperature is preferably set to 1200° C. or less in order not to generate silicon carbide, which will be resistance component. The heating device is not particularly limited, however, may be ones which can heat under an atmosphere of inert gas, such as a muffle furnace and a rotary kiln. Since hydrogen gas, carbon dioxide gas, carbon monoxide gas, and so on are generated during the reaction, it is preferable to be provided with a device to eliminate them. The reaction time varies depending on the loading amount and the reaction equipment, however, can be completed in one hour at 1000° C.

After the baking, it is preferable to pulverize the baked material to adjust to the appropriate particle size for a negative electrode active material.

The silicon composite obtained from the foregoing compounding is represented by the elemental composition formula of $Met^1$-Si—O—C—H (wherein $Met^1$ represents one alkali metal element or a mixture of alkali metal elements). Assuming that the composition ratio of each element is $Met^1_k$-Si—$O_l$—$C_m$—$H_n$, "k" is essential to be more than 0 since $Met^1$ (alkali metal element) is an essential component, and preferably $0<k<1$, $0.5<l<2$, $0.5<m<2$, $0<n<0.3$. More preferably, $0.5<l<1.2$.

It is possible to produce a non-aqueous electrolyte secondary battery, particularly lithium ion secondary battery, with high capacity, smaller irreversible capacity, and excellent energy density by using the inventive negative electrode active material (silicon composite particles) as the negative electrode. By the inventive negative electrode active material, generation of decomposed gas of the electrolyte is decreased, and collapse of the electrode due to the volume expansion is relaxed, and therefore excellent cycle performance can be obtained.

In this case, the obtained non-aqueous electrolyte secondary battery (particularly lithium ion secondary battery) is characterized in that using the negative electrode active material composed of the foregoing silicon composite particles, and the other materials of the positive electrode, the electrolyte, the separator, etc., and the shape of the battery are not limited. For example, as the positive electrode active material, oxide and chalcogen compound of transition metal such as $LiCoO_2$, $LiNiO_2$, $LiMn_2O_4$, $V_2O_6$, $MnO_2$, $TiS_2$, $MoS_2$, and so on can be used. As the electrolyte, for example, it is possible to use non-aqueous solution which contains lithium salt such as lithium perchlorate; as the non-aqueous solvent, it is possible to use one of propylene carbonate, ethylene carbonate, dimethoxyethane, γ-butyrolactone, 2-methyltetrahydrofuran or others or combination of two or more thereof. Other various non-aqueous electrolytes and solid electrolytes can be used. The shape of the secondary battery can be rectangular shape, cylindrical shape, coin shape, etc.

When producing a negative electrode using the foregoing negative electrode active material (silicon composite particle), an active material or a conductive agent such as graphite can be added to the silicon composite particle. In this case, the graphite active material or conductive agent is not particularly limited. In the constituted battery, it is possible to use any conductive material which does not occur decomposition or deterioration, specifically metal powder or metal fiber of Al, Ti, Fe, Ni, Cu, Zn, Ag, Sn, Si, etc., or graphite such as natural graphite, synthetic graphite, various coke powders, mesophase carbon, vapor growth carbon fiber, pitch-based carbon fiber, PAN-based carbon fiber, baked materials of various resins, etc. Other than that, binder can be added.

In producing the negative electrode, known methods can be used, and the producing method is not particularly limited. For example, the negative electrode can be produced by mixing the inventive negative electrode active material, carbon-based active material, a conducting agent, a binder, etc., applying the mixture to an electrolytic copper foil, followed by drying or baking and pressing the same in case of the needs. The total amount of the carbon-based active material and the conducting agent in the mixture can be set to 1 to 90% by weight, and the binder in the mixture can be set to 1 to 20% by mass, for example.

Second Embodiment

Then, the second embodiment of the present invention will be explained. Regarding the same matters as in the first embodiment, the explanation will be omitted.

The inventive negative electrode active material for a non-aqueous electrolyte secondary battery of the second embodiment is represented by an elemental composition formula of $Met^2$-Si—O—C—H. In the elemental composition formula, $Met^2$ represents one alkaline earth metal element or a mixture of alkaline earth metal elements. This negative electrode active material contains a silicate salt made of a silicon-based inorganic compound and the alkaline earth metal. The alkaline earth metal element used herein is preferably Mg or Ca. In the negative electrode active material of the present invention, preferably the silicate salt further contains group 3 to group 13 metal. More preferably, this group 3 to group 13 metal is first row transition metal or second row transition metal. In the inventive negative electrode active material, carbon particles can be dispersed in the silicate salt.

In the inventive negative electrode active material, the silicon-based inorganic compound forms a silicate salt with the alkaline earth metal (or alkaline earth metal and group 3 to group 13 element). Such constitution provides a SiOC-based negative electrode active material with low volume resistivity and low irreversible capacity.

This negative electrode active material also provide high storage stability in a state of electrode paste for producing electrodes, and is useful. As is found by the inventors, in the electrode paste of the Si—O—C composite being added Li, the storage stability is inferior to that of the negative electrode active material which is added alkaline earth metal as the present invention. As the alkaline earth metal used in the present invention, although the advantage of the present invention can be obtained by any group 2 element, Mg or Ca is particularly preferable.

In the negative electrode active material of the present invention, it is preferable that fine particles composed of silicon, silicon alloy, or silicon oxide (hereinafter also called generically as "silicon-based fine particles" simply) are dispersed in the silicate salt. In this case, the silicon-based fine particles function as an active material, and the silicate salt, in which the silicon-based fine particles are dispersed, also functions as an active material in the inventive negative electrode active material (silicon composite). By the constitution in which the silicon-based fine particles are dispersed in the silicate salt as described above, it is possible to provide a negative electrode active material with large battery capacity, and flat discharge curve, thereby having high energy density.

The inventive negative electrode active material is preferably particles with the volume-average particle size of the primary particle of 0.1 to 30 μm.

Such an inventive negative electrode active material can be obtained by mixing a compound of alkaline earth metal, and the composition containing a curable organic silicon compound, followed by baking the same.

Specifically, the producing method of the inventive negative electrode active material go through at least the following steps (a) to (c):
(a) mixing the compound of alkaline earth metal and a composition containing a curable organic silicon compound to form a raw material mixture;
(b) curing the curable organic silicon compound to cure the raw material mixture; and
(c) baking the cured raw material mixture to make the curable organic silicon compound to be inorganic material.

As the curable organic silicon compound used in the present invention, it is preferable to use a curable silicone composition, which is a composition of a reactive organic silicon compound having a cross-linkable group. The curable organic silicon composition is not particularly limited, and any known curable silicone composition can be used. Illustrative examples thereof include silicone compositions which are organic peroxide curable, radiation curable reactive, addition curable reactive, and condensation curable. In order to obtain a silicon-based inorganic compound with higher purity through baking to inorganic material, it is advantageous to use a silicone composition which is organic peroxide curable or radiation curable reactive. By selecting these composition, it is possible to suppress the total content of the impurity elements in the obtained silicon-based inorganic compound powder to 1 ppm or less, preferably 0.5 ppm or less, more preferably 0.1 ppm or less. Illustrative examples of the impurity elements particularly include Fe, Cr, Ni, Al, Ti, Cu, Na, Zn, Ca, Zr, Mg, and B, and the total content thereof can be suppressed as described above. Although alkaline earth metal elements such as Mg and Ca are mixed into the raw material mixture as described above, it is preferable for the curable organic silicon compound to be highly purified in order to suppress the impurities except for alkaline earth metal elements in the curable organic silicon compound. In other words, it is difficult to decrease the impurities except for alkaline earth metal elements solely from the curable organic silicon compound.

Illustrative examples of the organic peroxide curable silicone composition include the foregoing silicone compositions described in the first embodiment. As the radiation curable silicone composition, an ultraviolet curable silicone composition and an electron beam curable silicone composition can be mentioned. Illustrative examples of the ultraviolet curable silicone composition and the electron beam curable silicone composition include the ones described in the first embodiment. As the addition curable silicone composition and the condensation curable silicone composition, the foregoing ones described in the first embodiment can be mentioned. The radiation curable silicone composition and the organic peroxide curable silicone composition are desirable in order to avoid contamination of impurity elements.

The irreversible capacity can be effectively decreased by adding a metal compound of the alkaline earth metal before the stage for curing the composition of a curable organic silicon compound of step (b), that is in the stage of step (a). In this case, the irreversible capacity can be more effectively decreased by adding a metal compound of group 3 to group 13 metal, etc. As the alkaline earth metal compound to be added, metal compounds such as hydroxide, oxide, carbonate, and oxalate of the alkaline earth metal are preferably used in view of the reactivity with the curable silicone composition. Particularly, use of carbonate or oxalate of Mg or Ca and so on are preferable since the reaction can proceed effectively at the temperature where the silicon composite is formed. These alkaline earth metal compounds are easy to handle compared to use of metal simple substance. The group 3 to group 13 metal can be introduced by adding a metal compound such as Al and first row transition metal such as Ti, V, Cr, Mn, Fe, Co, Ni, Cu, Zn, and Ga. It can be a second row transition metal such as Zr, Nb, and Mo. As the metal compound, although various one can also be selected, hydroxide, oxide, and esterified compounds are preferable in view of reactivity.

The loading amount of the alkaline earth metal compound or the total loading amount of the alkaline earth metal compound and the compound of group 3 to group 13 metal is preferably 10 to 100 parts by mass with respect to 150 parts by mass of the curable organic silicon compound. This loading amount is more preferably 20 to 80 parts by mass, particularly preferably 30 to 60 parts by mass in view of efficiency to decrease the irreversible capacity and economic efficiency.

Before the stage for curing the composition of a curable organic silicon compound of step (b), that is in the stage of step (a), it is preferable to mix fine particles composed of silicon, silicon alloy, or silicon oxide. By mixing silicon-based fine particles into the raw material mixture as described above, followed by baking thereof in step (b), the silicon-based fine particles can be dispersed in the silicate salt, and a silicon composite with higher capacity can be obtained.

Illustrative examples of the silicon usable herein include industrial metal silicon with a purity of 95% or more (i.e., 95 to 100%), particularly 99.0% or more (i.e., 99.0 to 100%); polycrystalline silica and single crystal silica for semiconductors or for solar cells. In the present invention, it is also possible to use silicon alloy in which the foregoing silicon is incorporated with any of typical elements and transition metals such as Al, Ti, Co, Fe. As the silicon oxide, it is possible to use silicon oxide represented by the general formula SiOx ($1 \leq x < 1.6$) and can be obtained by thermal treatment of amorphous material under an inert gas atmosphere to disproportionate to silicon and silicon dioxide. It may also be a silicon particle, a silicon alloy particle, or a silicon oxide particle, the surface of which is subjected to water-repellent treatment with alkoxymethylsilane or alkoxyvinylsilane, or coated with carbon.

The primary particle size of these silicon, silicon alloy, or silicon oxide is preferably 100 nm to 10 μm in a volume-average particle size (e.g., particle size $D_{50}$ at the cumulative volume of 50% or median size) by a measuring method of particle size distribution with a laser diffraction method. This particle size is more preferably 100 nm to 7 μm, further preferably 100 nm to 1 μm. It is particularly preferable for the particle size to be uniform.

As the loading ratio of the silicon, silicon alloy, or silicon oxide and the composition of a curable organic silicon compound; silicon, silicon alloy, or silicon oxide is preferably 5 parts by mass or more, more preferably 10 parts by mass or more, with respect to 150 parts by mass of the composition of a curable organic silicon compound. On the other hand, as the upper limit, silicon, silicon alloy, or silicon oxide is preferably 200 parts by mass or less, more preferably 100 parts by mass or less, particularly preferably 50 parts by mass or less, with respect to the 100 parts by mass of the composition of a curable organic silicon compound. These preferable values of the upper limit are based on considering the weight loss on heating after the baking, which is approximately 30% by weight especially when a curable silicone is used as the curable organic silicon compound.

Before the stage to cure the composition of a curable silicone compound of step (b), that is in the stage of step (a), carbon particles can be added. The carbon particles to be added can be a conductive aid such as graphite and acetylene black. Particularly, it is preferable to be composed of any of natural graphite, synthetic graphite, and carbon fiber. The loading ratio is preferably 1 part by mass or more, more preferably 5 parts by mass or more with respect to 150 parts by mass of the composition of a curable organic silicon compound. This range enables to effectively decrease the volume resistivity of the silicon composite after the baking, and enables to improve the rate characteristic of the active material.

The foregoing raw material mixture obtained through mixing is cured (step (b)). The curing condition depends on the curable organic silicon compound to be used as described above, and may be a condition by which the curable organic silicon compound can be cured. After finishing the curing of step (b), the cured material is preferably pulverized prior to baking of step (c).

The compound of alkaline earth metal and the composition containing a curable organic silicon compound are mixed and cured through steps (a) and (b), and subsequently the cured raw material mixture is baked to make the curable organic silicon compound to be inorganic material (step (c)). This baking temperature is preferably the temperature of 600 to 1200° C. Since the reaction rapidly proceeds at about 600° C. and nearly ends at approximately 1000° C., the baking temperature is more preferably set to 600 to 1000° C. The baking temperature is preferably set to 1200° C. or less in order not to generate silicon carbide, which will be resistance component. The heating device is not particularly limited, however, may be the one which can heat under an atmosphere of inert gas, such as a muffle furnace and a rotary kiln. Since hydrogen gas, carbon dioxide gas, carbon monoxide gas, and so on are generated during the reaction, it is preferable to be provided with a device to eliminate them. The reaction time varies depending on the loading amount and the reaction equipment, however, can be completed in one hour at 1000° C.

After the baking, it is preferable to pulverize the baked material to adjust to the appropriate particle size for a negative electrode active material.

The silicon composite obtained from the foregoing compounding is represented by the elemental composition formula of $Met^2$-Si—O—C—H (wherein $Met^2$ represents one alkaline earth metal element or a mixture of alkaline earth metal elements). Assuming that the composition ratio of each element is $Met^2_k$-Si—$O_l$—$C_m$—$H_n$, "k" is essential to be more than 0 since $Met^2$ (alkaline earth metal element) is an essential component, and preferably $0<k<1$, $0.3<l<2.5$, $0.5<m<2.5$, $0<n<0.5$. More preferably, $0.5<m<1.8$.

It is possible to produce a non-aqueous electrolyte secondary battery, particularly lithium ion secondary battery, with high capacity and small irreversible capacity by using the negative electrode active material (silicon composite particle) obtained by the present invention as the negative electrode. A non-aqueous electrolyte secondary battery with particularly excellent energy density can be obtained by the negative electrode active material in which silicon-based fine particles are dispersed. By the inventive negative electrode active material, generation of decomposed gas of the electrolyte is decreased, and collapse of the electrode due to the volume expansion is relaxed, and therefore excellent cycle performance can be obtained.

In this case, the obtained non-aqueous electrolyte secondary battery (particularly lithium ion secondary battery) is characterized in that using the negative electrode active material composed of the foregoing silicon composite particles, and the other materials such as the positive electrode, the electrolyte, the separator, etc., and the shape of the battery are not limited. These can be the same as in the foregoing first embodiment. An addition of active material such as graphite or conductive agent, and an addition of binder also can be the same as in the foregoing first embodiment. The producing method of the negative electrode is not particularly limited too, and can be the same as in the foregoing first embodiment.

EXAMPLES

The present invention will be more specifically described below with reference to Examples and Comparative Examples, but the invention is not limited to thereto.

In the Examples described below, volume-average particle sizes ($D_{50}$: size at the cumulative volume of 50%) were measured by a wet method with laser diffraction particle size analyzer (MT3300EX II, produced by NIKKISO co., ltd.). The volume resistivity were measured with a four-point probe type volume resistivity meter (MCP-PD51, produced by Mitsubishi Chemical Analytech Co., Ltd.) at the loading of 12 kN. As the X-ray diffraction apparatus, D8 ADVANCE produced by BRUKER AXS K.K. was used. The Raman spectroscopies were measured with HR-800 apparatus produced by HORIBA, Ltd.

Example 1-1

In a 1 L container of a two-axis planetary mixer, 10 g of polycrystalline metal silicon particle with average particle size of 0.2 μm, 150 g of methylvinylsiloxane with the viscosity of 60,000 cp represented by the chemical formula (1) described below, and 10 g of lithium carbonate were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was greyish brown resin state, and the yield was 98.9%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 72.6%. The baked material was pulverized with a jet mill to give a black powder with the average particle size of 5.3 μm.

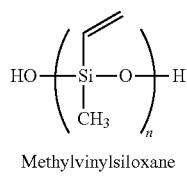

Methylvinylsiloxane

The producing condition and measured results of the powder of Example 1-1 are shown in Table 1.

Examples 1-2 to 1-8

Examples 1-2 to 1-8 were carried out on the same condition as Example 1-1 except for changing loading amounts of metal silicon and lithium carbonate from Example 1-1 (in Examples 1-6 to 1-8, also the loading amount of curing agent). The producing conditions and measured results of the powders of Examples 1-2 to 1-8 are shown in Table 1.

Comparative Example 1-1

In a 1 L container of a two-axis planetary mixer, 150 g of methylvinylsiloxane with the viscosity of 60,000 cp represented by the foregoing chemical formula (1) was loaded and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was greyish brown resin state, and the yield was 96.0%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material. The yield after baking at 1000° C. was 76.9%. The baked material was pulverized with a jet mill to give a black powder with the average particle size of 5.9 μm.

The producing condition and measured results of the powder of Comparative Example 1-1 are shown in Table 2.

Comparative Example 1-2

In a 1 L container of a two-axis planetary mixer, 150 g of methylvinylsiloxane with the viscosity of 60,000 cp represented by the foregoing chemical formula (1) and 10 g of lithium carbonate were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was colorless resin state, and the yield was 98.2%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 71.5%. The baked material was pulverized with a jet mill to give a black powder with the average particle size of 6.1 μm.

Comparative Examples 1-3 to 1-5

Comparative Examples 1-3 to 1-5 were carried out on the same condition as Comparative Example 1-2 except for changing loading amount of lithium carbonate from Comparative Example 1-2. The producing conditions and measured results of the powders of Comparative Examples 1-3 to 1-5 are shown in Table 2.

Comparative Example 1-6

In a 1 L container of a two-axis planetary mixer, 150 g of methylvinylsiloxane with the viscosity of 60,000 cp represented by the foregoing chemical formula (1) and 10 g of polycrystalline metal silicon with average particle size of 0.2 μm were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was colorless resin state, and the yield was 98.2%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 69.3%. The baked material was pulverized with a jet mill to give a black powder with the average particle size of 6.0 μm.

The producing condition and measured results of the powder of Comparative Example 1-6 are shown in Table 2.

Comparative Examples 1-7 and 1-8

Comparative Examples 1-7 and 1-8 were carried out on the same condition as Comparative Example 1-6 except for changing loading amount of metal silicon from Comparative Example 1-6. The producing conditions and measured results of the powders of Comparative Examples 1-7 and 1-8 are shown in Table 2.

TABLE 1

| | Example 1-1 | Example 1-2 | Example 1-3 | Example 1-4 | Example 1-5 | Example 1-6 | Example 1-7 | Example 1-8 |
|---|---|---|---|---|---|---|---|---|
| Methylvinylsiloxane of chemical formula (1) [g] | 150 | 150 | 150 | 150 | 150 | 150 | 150 | 150 |
| Polycrystalline metal silicon [g] | 10 | 30 | 50 | 10 | 30 | 50 | 50 | 50 |
| Lithium carbonate [g] | 10 | 10 | 10 | 20 | 20 | 20 | 30 | 50 |
| C-8A [g] | 0.8 | 0.8 | 0.8 | 0.8 | 0.8 | 1.0 | 1.0 | 1.0 |
| Particle size distribution, volume resistivity, and elemental composition after baking | | | | | | | | |
| $D_{50}$ [μm] | 5.3 | 5.1 | 5.3 | 5.7 | 5.3 | 4.8 | 4.5 | 5.1 |
| Volume resistivity [Ω · cm] | $3.32 \times 10^3$ | $1.87 \times 10^3$ | $1.25 \times 10^4$ | 6.55 | 55.8 | 97.5 | 92.2 | 87.6 |
| Li | 0.13 | 0.09 | 0.07 | 0.27 | 0.20 | 0.14 | 0.29 | 0.39 |
| Si | 1 | 1 | 1 | 1 | 1 | 1 | 1 | 1 |
| O | 1.08 | 0.76 | 0.58 | 1.11 | 0.84 | 0.69 | 0.87 | 0.77 |
| C | 1.53 | 1.13 | 0.84 | 1.39 | 0.99 | 0.82 | 1.01 | 0.61 |
| H | 0.07 | 0.05 | 0.10 | 0.04 | 0.04 | 0.04 | 0.14 | 0.10 |

TABLE 2

| | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 |
|---|---|---|---|---|---|---|---|---|
| Methylvinylsiloxane of chemical formula (1) [g] | 150 | 150 | 150 | 150 | 150 | 150 | 150 | 150 |
| Polycrystalline metal silicon [g] | 0 | 0 | 0 | 0 | 0 | 10 | 30 | 50 |
| Lithium carbonate [g] | 0 | 10 | 20 | 30 | 50 | 0 | 0 | 0 |
| C-8A [g] | 0.8 | 0.8 | 0.8 | 0.8 | 0.8 | 0.8 | 0.8 | 0.8 |
| Particle size distribution, volume resistivity, and elemental composition after baking | | | | | | | | |
| $D_{50}$ [μm] | 5.9 | 6.1 | 5.7 | 5.9 | 6.5 | 6.0 | 5.9 | 5.8 |
| Volume resistivity [Ω · cm] | Out of measurement range (large resistivity) | $5.22 \times 10^3$ | $1.14 \times 10^2$ | 88.1 | 22.1 | Out of measurement range (large resistivity) | Out of measurement range (large resistivity) | Out of measurement range (large resistivity) |
| Li | — | 0.18 | 0.36 | 0.55 | 0.97 | — | — | — |
| Si | 1 | 1 | 1 | 1 | 1 | 1 | 1 | 1 |
| O | 1.08 | 1.21 | 1.36 | 1.61 | 1.92 | 0.87 | 0.63 | 0.49 |
| C | 1.86 | 1.99 | 1.88 | 1.89 | 1.51 | 1.50 | 1.08 | 0.84 |
| H | 0.26 | 0.21 | 0.15 | 0.18 | 0.12 | 0.25 | 0.21 | 0.18 |

The X-ray diffraction spectra of powder particles produced in Example 1-6 and Comparative Example 1-3 are shown in FIG. 1, and the spectra of Raman spectroscopy of the same are shown in FIG. 2. A cross-sectional image of scanning electron microscope of black powder in Example 1-6 is shown in FIG. 3.

In the X-ray diffraction spectrum of Comparative Example 1-3, the signals assignable to $Li_2SiO_3$ were observed near 15 to 25°, which reveals that the SiOC material and Li were reacted. On the other hand, in the X-ray diffraction spectrum of Example 1-6, a sharp signal attributable to Si (111) was observed near 28.4°, and a broad signal was observed near 15 to 25°.

In the Raman spectrum of Comparative Example 1-3, signals were observed near 1340 cm$^{-1}$ and 1600 cm$^{-1}$, which are attributable to the diamond structure and the graphite structure respectively, however, the signal attributable to silicon was not observed. Accordingly, it has been suggested that crystalline silicon was not contained in the SiOC material. On the other hand, in the powder of Example 1-6, in which silicon had been added, the signal of silicon was observed near 520 cm$^{-1}$, and the signals attributable to the diamond structure and the graphite structure were observed near 1340 cm$^{-1}$ and 1600 cm$^{-1}$, respectively. Accordingly, it has been confirmed that the composite material of the Example was a composite of crystalline silicon and SiOC material.

By the SEM observation of the cross-sectional of the powder in Example 1-6, it was confirmed that Si had been dispersed in the SiOC material (FIG. 3).

As shown in Table 2, it has been confirmed that although SiOC is low conductive material with high volume resistivity, the conductivity can be improved by introducing Li. Moreover, Example 1-8, in which metal silicon was added, shown in Table 1 showed a lower value of volume resistivity than the Comparative Examples (Comparative Examples 1-1 and 1-6 to 1-8), in which Li was not added, thereby being confirmed to be efficient as a battery material.

<Evaluation of Battery Performance>

The battery performance of the particles obtained by Examples 1-1 to 1-8 and Comparative Examples 1-1 to 1-8 were evaluated to check their usefulness as a negative-electrode active material. Examples 1-9 to 1-16 and Comparative Examples 1-9 to 1-16 correspond to the examples using each of the particles obtained by Examples 1-1 to 1-8 and Comparative Examples 1-1 to 1-8, respectively.

The mixture composed of 85% of silicon composite particle in each of the Examples 1-1 to 1-8 and Comparative Examples 1-1 to 1-8 as a negative electrode active material, 2.5% of synthetic graphite (average particle size $D_{50}$=3 μm) as a conductive agent and acetylene black dispersed in N-methylpyrrolidone (solid content: 17.5%) at an amount of 2.5% in terms of solid content was diluted with N-methylpyrrolidone. To this, polyimide resin manufactured by Ube Industries, Ltd. (trade name: U-varnish-11D025, solid content: 31%) was added at an amount of 10% in terms of solid content as a binder to form a slurry.

This slurry was applied to a 12-μm-thickness copper foil with a 50 μm doctor blade. After pre-drying, each electrode was pressed by roller press at 60° C., was dried at 300° C. for 2 hours, and was punched out into 2 cm² negative electrode molded bodies.

The obtained negative electrode molded body was made into lithium ion secondary battery for evaluation by using a lithium foil as a counter electrode, a non-aqueous electrolyte solution obtained by dissolving a non-aqueous electrolyte of lithium bis(trifluoromethanesulfonyl)imide in a 1/1 (volume ratio) mixture of ethylene carbonate and diethyl carbonate at a concentration of 1 mol/L, and a separator of a polyethylene microporous film having a thickness of 30 μm to produce four pieces of lithium ion secondary batteries for each Example.

The produced lithium ion secondary batteries were aged a night at room temperature. Two of the lithium ion secondary batteries were then disassembled to measure the thicknesses of the negative electrodes.

With a secondary battery charge/discharge tester (product of NAGANO & Co., Ltd.), the other two lithium ion secondary batteries were each charged with a constant current of 0.15 c until the voltage of the test cell reached 0 V. After the voltage reached 0 V, the charging was continued while the current was decreased so as to keep the voltage of the test cell 0 V. When the current was decreased to less than 0.02 c, the charging was terminated to calculate the charge capacity. It is to be noted that the symbol "c" means a current value with which the theoretical capacity of a negative electrode is charged in 1 hour. These two pieces were disassembled similarly to measure the thicknesses of the negative electrodes, thereby calculating the volume change ratio. The results are shown in Tables 3 and 4. The charge/discharge curves in Example 1-6, Comparative Examples 1-2 and 1-5 are shown in FIG. 4.

TABLE 3

|  | Examples | | | | | | | |
|---|---|---|---|---|---|---|---|---|
|  | Example 1-9 | Example 1-10 | Example 1-11 | Example 1-12 | Example 1-13 | Example 1-14 | Example 1-15 | Example 1-16 |
| Active material used | Example 1-1 | Example 1-2 | Example 1-3 | Example 1-4 | Example 1-5 | Example 1-6 | Example 1-7 | Example 1-8 |
| Charging capacity [mAh/g] | 1216 | 1408 | 1626 | 939 | 1201 | 1478 | 1140 | 1380 |
| Discharging capacity [mAh/g] | 928 | 1147 | 1357 | 706 | 937 | 1198 | 850 | 1210 |
| Initial charge/discharge efficiency [%] | 76 | 81 | 83 | 75 | 78 | 81 | 75 | 88 |
| Irreversible capacity [mAh/g] | 288 | 261 | 269 | 233 | 264 | 279 | 190 | 170 |
| Volume change ratio (ΔV) [%] | 127 | 166 | 169 | 130 | 171 | 189 | 169 | 172 |

TABLE 4

|  | Comparative Examples | | | | | | | |
|---|---|---|---|---|---|---|---|---|
|  | Comparative Example 1-9 | Comparative Example 1-10 | Comparative Example 1-11 | Comparative Example 1-12 | Comparative Example 1-13 | Comparative Example 1-14 | Comparative Example 1-15 | Comparative Example 1-16 |
| Active material used | Comparative Example 1-1 | Comparative Example 1-2 | Comparative Example 1-3 | Comparative Example 1-4 | Comparative Example 1-5 | Comparative Example 1-6 | Comparative Example 1-7 | Comparative Example 1-8 |
| Charging capacity [mAh/g] | 1223 | 1030 | 927 | 856 | 670 | 1410 | 1710 | 1930 |
| Discharging capacity [mAh/g] | 772 | 740 | 638 | 591 | 440 | 980 | 1305 | 1520 |
| Initial charge/discharge efficiency [%] | 63 | 72 | 69 | 69 | 66 | 70 | 76 | 79 |
| Irreversible capacity [mAh/g] | 451 | 291 | 289 | 265 | 230 | 430 | 405 | 380 |
| Volume change ratio (ΔV) [%] | 134 | 132 | 128 | 135 | 115 | 175 | 180 | 200 |

As shown in Table 4, the battery of Comparative Example 1-9 using an active material of Comparative Example 1-1, which is commonly known SiOC material, showed very high irreversible capacity of 451 mAh/g and very low first efficiency of 63%. On the other hand, the batteries of Comparative Examples 1-10 to 1-13 using active materials in which lithium had been introduced (Comparative Examples 1-2 to 1-5) showed decreased discharging capacities, although the irreversible capacities were lowered. Therefore, they are not attractive as batteries. In the batteries of Comparative Examples 1-14 to 1-16, using active materials in which metal silicon had been added (Comparative Examples 1-6 to 1-8), the charging capacities were largely improved to improve the first efficiencies, the discharge curves approached that of silicon to cause a flat region, and the average voltage were high and the energy densities were improved thereby. However, the irreversible capacities themselves were scarcely changed, and the volume resistivity of the composite particles were high as shown in Table 2, suggesting that battery performance were not maintained sufficiently to be required as active materials.

On the other hand, in Examples 1-9 to 1-16, additions of lithium carbonate and metal silicon decreased the irreversible capacities, and additions of metal silicon tended to increase the discharging capacities, which have revealed that the active material, had increased first efficiencies and little losses of the irreversible capacity. In addition, the volume change rates were the same as common silicon oxides, although they are active materials with high capacity.

<Evaluation of Cycle Performance>

In order to evaluate the cycle performance of obtained negative electrode molded bodies, negative electrode molded bodies in Example 1-13, Comparative Example 1-9 and 1-15 were used. Positive electrode molded bodies were produced by using a positive electrode material using a positive electrode active material of $LiCoO_2$ and a current collector of an aluminum foil single layer sheet (product of Pionics Co., Ltd., brand name: Pioxcel C-100). Lithium ion secondary batteries in coin form were produced by using a non-aqueous electrolyte solution obtained by dissolving a non-aqueous electrolyte of lithium hexafluorophosphate in a 1/1 (volume ratio) mixture of ethylene carbonate and diethyl carbonate at a concentration of 1 mol/L, and a separator of a polyethylene microporous film having a thickness of 30 μm.

The produced four lithium ion secondary batteries in coin form were left at room temperature for two nights. With the secondary battery charge/discharge tester (product of NAGANO & Co., Ltd.), the lithium ion secondary batteries were each charged with a constant current of 1.2 mA (0.25 c on the positive electrode basis) until the voltage of the test cell reached 4.2 V. After the voltage reached 4.2 V, the charging was continued while the current was decreased so as to keep the voltage of the test cell 4.2 V. When the current was decreased to less than 0.3 mA, the charging was terminated. The batteries were then discharged at a constant current of 0.6 mA. The discharging was terminated when the cell voltage reached 2.5 V to calculate the discharging capacity. This was repeated 200 cycles. The results are shown in FIG. 5.

In the negative electrode molded body of Comparative Example 1-9 using a common SiOC active material, the cycle stability was high although the cycle performance drops at the initial stage due to the irreversible capacity. On the other hand, in the negative electrode molded body of Comparative Example 1-15 with metal silicon being added to SiOC material, the initial drop could be relaxed, the cycle degradation was too intense to be practical. In the one using the negative electrode molded body of Example 1-13, the initial drop was relaxed by the effects of metal silicon addition and Li introduction, and the cycle retention performance was equivalent to common SiOC (Comparative Example 1-9).

Although the foregoing Examples show examples with Li being added to negative electrode active materials, similar results were obtained in the examples with Na being added.

Example 2-1

In a 1 L container of a two-axis planetary mixer, 150 g of methylvinylsiloxane with the viscosity of 60,000 cp represented by the chemical formula (1) described below and 10 g of calcium carbonate were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was colorless resin state, and the yield was 98.7%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 76.5%. The baked material was pulverized with a jet mill to give a black powder with the average particle size of 5.8 μm.

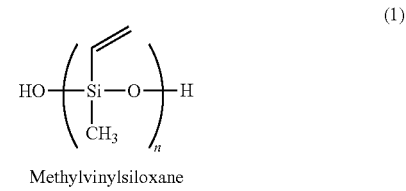

Methylvinylsiloxane

The producing condition and measured results of the powder of Example 2-1 are shown in Table 5.

Examples 2-2 to 2-4

Examples 2-2 to 2-4 were carried out on the same condition as Example 2-1 except for changing loading amount of calcium carbonate. The producing conditions and measured results of the powders of Examples 2-2 to 2-4 are shown in Table 5.

Example 2-5

In a 1 L container of a two-axis planetary mixer, 10 g of polycrystalline metal silicon particle with average particle size of 0.2 μm, 150 g of methylvinylsiloxane with the viscosity of 60,000 cp represented by the foregoing chemical formula (1), and 10 g of calcium carbonate were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5- dimethyl-2,5-bis(t-butylperoxy)-hexane was added, followed by curing reaction at 150° C. for 1 hour. The obtained cured material after cooling was greyish brown resin state, and the yield was 99.0%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 83.7%. The baked material was pulverized with a jet mill to give a black powder with the average particle size of 5.7 μm.

The producing condition and measured results of the powder of Example 2-5 are shown in Table 6.

Examples 2-6 to 2-12

Examples 2-6 to 2-12 were carried out on the same condition as Example 2-5 except for changing loading amounts of metal silicon and calcium carbonate from Example 2-5. The producing conditions and measured results of the powders of Examples 2-6 to 2-12 are shown in Table 6.

Comparative Example 2-1

In a 1 L container of a two-axis planetary mixer, 150 g of methylvinylsiloxane with the viscosity of 60,000 cp represented by the foregoing chemical formula (1) was loaded and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was greyish brown resin state, and the yield was 96.0%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material. The yield after baking at 1000° C. was 76.9%. The baked material was pulverized with a jet mill to give a black powder with the average particle size of 5.9 μm.

The producing condition and measured results of the powder of Comparative Example 2-1 are shown in Table 7.

Comparative Example 2-2

In a 1 L container of a two-axis planetary mixer, 150 g of methylvinylsiloxane with the viscosity of 60,000 cp represented by the foregoing chemical formula (1) and 10 g of lithium carbonate were loaded, and kneaded at the rotating speed of 30 rpm for 1 hour. As a curing agent, 0.8 g of curing agent for silicone rubber compound manufactured by Shin-Etsu Chemical Co., Ltd. (brand name: C-8A) which contains 80% by mass of 2,5-dimethyl-2,5-bis(t-butylperoxy)-hexane was added, followed by curing reaction at 150° C. for 1 hour. The obtained cured material after cooling was colorless resin state, and the yield was 98.2%. Then, the obtained cured material was pulverized to diameters of approximately 1 mm, and 100 g of the same was loaded into an alumina crucible with the capacity of 280 mL. This was baked in a muffle furnace under an argon gas atmosphere in a condition of 1000° C. for 1 hour. The obtained baked material was black glassy material, and deterioration such as generation of heat, combustion, or deliquescence were not observed even in the atmospheric air. The yield after baking at 1000° C. was 71.5%. The baked material was pulverized with a jet mill to give a black powder with the average particle size of 6.1 μm.

The producing condition and measured results of the powder of Comparative Example 2-2 are shown in Table 7.

Comparative Examples 2-3 and 2-4

Comparative Examples 2-3 and 2-4 were carried out on the same condition as Comparative Example 2-2 except for changing loading amount of lithium carbonate from Comparative Example 2-2. The producing conditions and measured results of the powders of Comparative Examples 2-3 and 2-4 are shown in Table 7.

TABLE 5

| Examples | Example 2-1 | Example 2-2 | Example 2-3 | Example 2-4 |
|---|---|---|---|---|
| Methylvinylsiloxane of chemical formula (1) [g] | 150 | 150 | 150 | 150 |
| Polycrystalline metal silicon [g] | 0 | 0 | 0 | 0 |
| Calcium carbonate [g] | 10 | 20 | 30 | 60 |
| C-8A [g] | 0.8 | 0.8 | 0.8 | 0.8 |
| Particle size distribution, volume resistivity, and elemental composition after baking | | | | |
| $D_{50}$ [μm] | 5.8 | 5.9 | 5.9 | 5.7 |
| Volume resistivity [Ω · cm] | $3.34 \times 10^6$ | $5.63 \times 10^5$ | $2.67 \times 10^2$ | $3.48 \times 10^1$ |
| Ca | 0.06 | 0.12 | 0.18 | 0.39 |
| Si | 1 | 1 | 1 | 1 |
| O | 1.10 | 1.19 | 1.35 | 1.98 |
| C | 1.94 | 1.88 | 1.99 | 2.07 |
| H | 0.38 | 0.31 | 0.14 | 0.17 |

TABLE 6

| | Examples | | | | | | | |
|---|---|---|---|---|---|---|---|---|
| | Example 2-5 | Example 2-6 | Example 2-7 | Example 2-8 | Example 2-9 | Example 2-10 | Example 2-11 | Example 2-12 |
| Methylvinylsiloxane of chemical formula (1) [g] | 150 | 150 | 150 | 150 | 150 | 150 | 150 | 150 |
| Polycrystalline metal silicon [g] | 10 | 30 | 50 | 10 | 30 | 50 | 10 | 50 |

TABLE 6-continued

| | Examples | | | | | | | |
|---|---|---|---|---|---|---|---|---|
| | Example 2-5 | Example 2-6 | Example 2-7 | Example 2-8 | Example 2-9 | Example 2-10 | Example 2-11 | Example 2-12 |
| Calcium carbonate [g] | 10 | 10 | 10 | 20 | 20 | 20 | 30 | 60 |
| C-8A [g] | 0.8 | 0.8 | 0.8 | 0.8 | 0.8 | 1.0 | 1.0 | 1.0 |
| Particle size distribution, volume resistivity, and elemental composition after baking | | | | | | | | |
| $D_{50}$ [μm] | 5.7 | 5.7 | 5.8 | 5.9 | 5.9 | 6.0 | 5.7 | 6.1 |
| Volume resistivity [Ω·cm] | $3.86 \times 10^6$ | $4.57 \times 10^6$ | $5.10 \times 10^6$ | $5.88 \times 10^5$ | $1.27 \times 10^6$ | $4.28 \times 10^6$ | $1.61 \times 10^4$ | $1.53 \times 10^3$ |
| Ca | 0.05 | 0.03 | 0.03 | 0.09 | 0.07 | 0.05 | 0.15 | 0.14 |
| Si | 1 | 1 | 1 | 1 | 1 | 1 | 1 | 1 |
| O | 0.87 | 0.62 | 0.48 | 0.94 | 0.66 | 0.51 | 1.25 | 0.71 |
| C | 1.154 | 1.10 | 0.85 | 1.48 | 1.04 | 0.81 | 1.69 | 0.74 |
| H | 0.37 | 0.33 | 0.32 | 0.28 | 0.27 | 0.22 | 0.17 | 0.11 |

TABLE 7

| | Comparative Examples | | | |
|---|---|---|---|---|
| | Comparative Example 2-1 | Comparative Example 2-2 | Comparative Example 2-3 | Comparative Example 2-4 |
| Methylvinyl-siloxane of chemical formula (1) [g] | 150 | 150 | 150 | 150 |
| Lithium carbonate [g] | 0 | 10 | 20 | 30 |
| C-8A [g] | 0.8 | 0.8 | 0.8 | 0.8 |
| $D_{50}$ [μm] | 5.9 | 6.1 | 5.7 | 5.9 |
| Volume resistivity [Ω·cm] | Out of measurement range (large resistivity) | $5.22 \times 10^3$ | $1.14 \times 10^2$ | $8.81 \times 10^1$ |
| Li | — | 0.18 | 0.36 | 0.55 |
| Si | 1 | 1 | 1 | 1 |
| O | 1.08 | 1.21 | 1.36 | 1.61 |
| C | 1.86 | 1.99 | 1.88 | 1.89 |
| H | 0.26 | 0.21 | 0.15 | 0.18 |

The X-ray diffraction spectra of powder particles produced in Example 2-3 and Comparative Example 2-11 are shown in FIG. 6, and the spectra of Raman spectroscopy of the same are shown in FIG. 7. A cross-sectional image of scanning electron microscope of black powder in Example 2-10 is shown in FIG. 8.

In the X-ray diffraction spectrum of Example 2-3, the signals assignable to $CaSiO_3$ were observed near 15 to 25°, which reveals that the SiOC material and Ca were reacted. On the other hand, in the X-ray diffraction spectrum of Example 2-11, a sharp signal attributable to Si (111) was observed near 28.4°, and a broad signal was observed near 15 to 25°.

In the Raman spectra of both Examples 2-3 and 2-11, signals were observed near 1340 $cm^{-1}$ and 1600 $cm^{-1}$, which are attributable to the diamond structure and the graphite structure respectively; however, the signal attributable to silicon was not observed in the spectrum of Example 2-3. Accordingly, it has been suggested that crystalline silicon was not contained in the CaSiOC material in Example 2-3. On the other hand, in the powder of Example 2-11, in which silicon had been added, the signal of silicon was observed near 520 $cm^{-1}$. Accordingly, it has been confirmed that the composite material of Example 2-11 was a composite of crystalline silicon and SiOC material.

By the SEM observation of the cross-sectional of the powder in Example 2-10, it was confirmed that Si had been dispersed in the CaSiOC material (FIG. 8).

Although SiOC is low conductive material with high volume resistivity as shown in Comparative Example 2-1 in Table 7, it has been confirmed that the conductivity can be improved by introducing Ca. Moreover, the volume resistivity of Examples 2-1 to 2-12, in which metal silicon was not added or was added, shown in Table 5 and Table 6 showed lower values than Comparative Example 2-1, in which Li or Ca was not added, thereby revealing the efficiency as a battery material.

<Evaluation of Battery Performance>

The battery performance were evaluated on the particles obtained by Examples 2-1 to 2-12 and Comparative Examples 2-1 to 2-4 to check the usefulness as a negative electrode active material. Examples 2-13 to 2-24 and Comparative Examples 2-5 to 2-8 correspond to the examples using each of the particles obtained by Examples 2-1 to 2-12 and Comparative Examples 2-1 to 2-4, respectively.

The mixture composed of 85% of particle in each of the Examples 2-1 to 2-12 and Comparative Examples 2-1 to 2-4 as a negative electrode active material, 2.5% of synthetic graphite (average particle size $D_{50}$=3 μm) as a conductive agent, and acetylene black dispersed in N-methylpyrrolidone (solid content: 17.5%) at an amount of 2.5% in terms of solid content was diluted by N-methylpyrrolidone. To this, polyimide resin manufactured by Ube Industries, Ltd. (trade name: U-varnish-11D025, solid content: 31%) was added at an amount of 10% in terms of solid content as a binder to form slurry.

This slurry was applied to a 12-μm-thickness copper foil with a 50 μm doctor blade. After pre-drying, each electrode was pressed by roller press at 60° C., was dried at 300° C. for 2 hours, and was punched out into 2 $cm^2$ negative electrode molded bodies.

The obtained negative electrode molded body was used to make a lithium ion secondary battery for evaluation by using a lithium foil as a counter electrode, a non-aqueous electrolyte solution obtained by dissolving a non-aqueous electrolyte of lithium bis(trifluoromethanesulfonyl)imide in a 1/1 (volume ratio) mixture of ethylene carbonate and diethyl carbonate at a concentration of 1 mol/L, and a separator of a polyethylene microporous film having a thickness of 30 μm to produce four pieces of lithium ion secondary batteries for each Example.

The manufactured lithium-ion secondary batteries were aged a night at room temperature. Two of the lithium-ion secondary batteries were then disassembled to measure the thickness of the negative electrodes.

With a secondary battery charge/discharge tester (product of NAGANO & Co., Ltd.), the other two lithium ion secondary batteries were each charged with a constant current of 0.15 c until the voltage of the test cell reached 0 V. After the voltage reached 0 V, the charging was continued while the current was decreased so as to keep the voltage of the test cell 0 V. When the current was decreased to less than 0.02 c, the charging was terminated to calculate the charge capacity. It is to be noted that the symbol "c" means a current value with which the theoretical capacity of a negative electrode is charged in 1 hour. These two pieces were disassembled similarly to measure the thickness of the negative electrodes, thereby calculating the volume change ratio. The results are shown in Tables 8 to 10.

TABLE 8

| | Examples | | | |
|---|---|---|---|---|
| | Example 2-13 | Example 2-14 | Example 2-15 | Example 2-16 |
| Active material used | Example 2-1 | Example 2-2 | Example 2-3 | Example 2-4 |
| Charging capacity [mAh/g] | 1175 | 1046 | 918 | 600 |
| Discharging capacity [mAh/g] | 838 | 716 | 566 | 400 |
| Initial charge/discharge efficiency [%] | 71 | 68 | 62 | 67 |
| Irreversible capacity [mAh/g] | 337 | 331 | 353 | 200 |
| Volume change ratio ($\Delta V$) [%] | 128 | 120 | 135 | 115 |

TABLE 9

| | Examples | | | | | | | |
|---|---|---|---|---|---|---|---|---|
| | Example 2-17 | Example 2-18 | Example 2-19 | Example 2-20 | Example 2-21 | Example 2-22 | Example 2-23 | Example 2-24 |
| Active material used | Example 2-5 | Example 2-6 | Example 2-7 | Example 2-8 | Example 2-9 | Example 2-10 | Example 2-11 | Example 2-12 |
| Charging capacity [mAh/g] | 1360 | 1650 | 1880 | 1230 | 1530 | 1770 | 1080 | 1230 |
| Discharging capacity [mAh/g] | 950 | 1280 | 1550 | 880 | 1210 | 1480 | 770 | 1030 |
| Initial charge/discharge efficiency [%] | 70 | 78 | 82 | 72 | 79 | 84 | 71 | 86 |
| Irreversible capacity [mAh/g] | 410 | 370 | 330 | 350 | 320 | 290 | 310 | 200 |
| Volume change ratio ($\Delta V$) [%] | 157 | 186 | 191 | 154 | 177 | 189 | 143 | 168 |

TABLE 10

| | Comparative Examples | | | |
|---|---|---|---|---|
| | Comparative Example 2-5 | Comparative Example 2-6 | Comparative Example 2-7 | Comparative Example 2-8 |
| Active material used | Comparative Example 2-1 | Comparative Example 2-2 | Comparative Example 2-3 | Comparative Example 2-4 |
| Charging capacity [mAh/g] | 1223 | 1030 | 927 | 856 |
| Discharging capacity [mAh/g] | 772 | 740 | 638 | 591 |
| Initial charge/discharge efficiency [%] | 63 | 72 | 69 | 69 |
| Irreversible capacity [mAh/g] | 451 | 291 | 289 | 265 |
| Volume change ratio ($\Delta V$) [%] | 134 | 132 | 128 | 135 |

The following has revealed from Tables 8 to 10. By comparison of Examples 2-13 to 2-15 using active materials of Example 2-1 to 2-3 and Comparative Examples 2-6 to 2-8 using active materials of Comparative Examples 2-2 to 2-4, it has found that lithium carbonate showed superior decreasing effect of irreversible capacity due to the difference of molecular weight and the difference of ionic valence between lithium carbonate and calcium carbonate when they were added in the same parts by weight. However, in the electrodes of Comparative Examples 2-6 to 2-8 using active materials in which lithium carbonate had been added (Comparative Examples 2-2 to 2-4), all of the electrode pastes occurred gelation to confirm the low storage stabilities. On the other hand, in Examples 2-13 to 2-24 using calcium carbonate, gelation or viscosity change were not observed, and excellent usefulness has been revealed.

In all of Examples 2-13 to 2-24, decreases of irreversible capacity are observed compared to Comparative Example 2-5. In the active materials used in these Examples, the irreversible capacities were decreased by additions of calcium carbonate (or calcium carbonate and metal silicon), and the discharging capacity tended to increase by additions of metal silicate, which have revealed that the active material gave increased first efficiencies and little losses of the irreversible capacity. In addition, the volume change rates were the same as common silicon oxides although they are active materials with high capacity.

<Evaluation of Cycle Performance>

In order to evaluate the cycle performance of obtained negative electrode molded bodies, by using negative electrode molded bodies of Examples 2-13, 2-14, 2-23, and 2-24, and Comparative Example 2-7, lithium ion secondary batteries in coin form were each produced using a lithium foil as a counter electrode, a non-aqueous electrolyte solution obtained by dissolving a non-aqueous electrolyte of lithium bis(trifluoromethanesulfonyl)imide in a 1/1 (volume ratio) mixture of ethylene carbonate and diethyl carbonate at a concentration of 1 mol/L, and a separator of a polyethylene microporous film having a thickness of 30 μm.

The produced lithium ion secondary batteries in coin form were left at room temperature for two nights. With the secondary battery charge/discharge tester (product of NAGANO & Co., Ltd.), the lithium ion secondary batteries were charged with a constant current of 0.5 mA (0.3 c on the negative electrode basis) until the voltage of the test cell reached 5 mV. After the voltage reached 5 mV, the charging was continued while the current was decreased so as to keep the voltage of the test cell 5 mV. When the current was decreased to less than 0.1 mA, the charging was terminated.

The batteries were then discharged at a constant current of 0.5 mA. The discharging was terminated when the cell voltage reached 2000 mV to calculate the discharging capacity. This was repeated 50 cycles. The results are shown in FIG. 9. It has found that higher discharging capacities and higher cycle stabilities were obtained in every Examples than Comparative Example 2-7.

Although the foregoing Examples show examples with Ca being added to negative electrode active materials, similar results were obtained in examples with Mg being added.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material for a non-aqueous electrolyte secondary battery, wherein the negative electrode active material is represented by an elemental composition formula of $Met^1$-Si—O—C—H (wherein $Met^1$ represents one alkali metal element or a mixture of alkali metal elements), comprising:
   a silicate salt made of a silicon-based inorganic compound and the alkali metal, and
   fine particles composed of silicon, silicon alloy, or silicon oxide being dispersed in the silicate salt.

2. The negative electrode active material for a non-aqueous electrolyte secondary battery according to claim 1, wherein the alkali metal element is Li or Na.

3. A negative electrode active material for a non-aqueous electrolyte secondary battery, wherein the negative electrode active material is represented by an elemental composition formula of $Met^2$-Si—O—C—H (wherein $Met^2$ represents one alkaline earth metal element or a mixture of alkaline earth metal elements), comprising:
   a silicate salt made of a silicon-based inorganic compound and the alkaline earth metal.

4. The negative electrode active material for a non-aqueous electrolyte secondary battery according to claim 3, wherein the alkaline earth metal element is Mg or Ca.

5. The negative electrode active material for a non-aqueous electrolyte secondary battery according to claim 3, further comprising fine particles composed of silicon, silicon alloy, or silicon oxide being dispersed in the silicate salt.

6. The negative electrode active material for a non-aqueous electrolyte secondary battery according to claim 1, wherein the silicate salt further contains group 3 to group 13 metal.

7. The negative electrode active material for a non-aqueous electrolyte secondary battery according to claim 3, wherein the silicate salt further contains group 3 to group 13 metal.

8. The negative electrode active material for a non-aqueous electrolyte secondary battery according to claim 6, wherein the group 3 to group 13 metal is first row transition metal or second row transition metal.

9. The negative electrode active material for a non-aqueous electrolyte secondary battery according to claim 7, wherein the group 3 to group 13 metal is first row transition metal or second row transition metal.

10. The negative electrode active material for a non-aqueous electrolyte secondary battery according to claim 1, wherein carbon particles are dispersed in the silicate salt.

11. The negative electrode active material for a non-aqueous electrolyte secondary battery according to claim 3, wherein carbon particles are dispersed in the silicate salt.

12. A negative electrode for a non-aqueous electrolyte secondary battery, comprising the negative electrode active material for a non-aqueous electrolyte secondary battery according to claim 1.

13. A negative electrode for a non-aqueous electrolyte secondary battery, comprising the negative electrode active material for a non-aqueous electrolyte secondary battery according to claim 3.

14. A non-aqueous electrolyte secondary battery, comprising the negative electrode for a non-aqueous electrolyte secondary battery according to claim 12.

15. A non-aqueous electrolyte secondary battery, comprising the negative electrode for a non-aqueous electrolyte secondary battery according to claim 13.

16. A method of producing a negative electrode active material for a non-aqueous electrolyte secondary battery, comprising the steps of:
   mixing a compound of alkali metal, a composition containing a curable organic silicon compound, and fine particles composed of silicon, silicon alloy, or silicon oxide to form a raw material mixture;
   curing the curable organic silicon compound to cure the raw material mixture; and
   baking the cured raw material mixture to make the curable organic silicon compound to be inorganic material.

17. A method of producing a negative electrode active material for a non-aqueous electrolyte secondary battery, comprising the steps of:
   mixing a compound of alkaline earth metal, a composition containing a curable organic silicon compound to form a raw material mixture;
   curing the curable organic silicon compound to cure the raw material mixture; and
   baking the cured raw material mixture to make the curable organic silicon compound to be inorganic material.

18. The method of producing a negative electrode active material for a non-aqueous electrolyte secondary battery according to claim 17, wherein the raw material mixture is further mixed with fine particles composed of silicon, silicon alloy, or silicon oxide.

19. The method of producing a negative electrode active material for a non-aqueous electrolyte secondary battery according to claim 16, wherein the raw material mixture is further mixed with a compound of group 3 to group 13 metal.

20. The method of producing a negative electrode active material for a non-aqueous electrolyte secondary battery according to claim 17, wherein the raw material mixture is further mixed with a compound of group 3 to group 13 metal.

21. The method of producing a negative electrode active material for a non-aqueous electrolyte secondary battery according to claim 16, wherein the raw material mixture is further mixed with carbon particles.

22. The method of producing a negative electrode active material for a non-aqueous electrolyte secondary battery according to claim 17, wherein the raw material mixture is further mixed with carbon particles.

23. The method of producing a negative electrode active material for a non-aqueous electrolyte secondary battery according to claim 21, wherein the carbon particles are composed of any of natural graphite, synthetic graphite, and carbon fiber.

24. The method of producing a negative electrode active material for a non-aqueous electrolyte secondary battery according to claim 22, wherein the carbon particles are composed of any of natural graphite, synthetic graphite, and carbon fiber.

* * * * *